(12) United States Patent
Vajravel et al.

(10) Patent No.: US 10,798,097 B2
(45) Date of Patent: Oct. 6, 2020

(54) INTELLIGENT REDIRECTION OF AUTHENTICATION DEVICES

(71) Applicant: Dell Products L.P., Round Rock, TX (US)

(72) Inventors: Gokul Thiruchengode Vajravel, Rayasandra Bengaluru (IN); Ankit Kumar, Jharkhand (IN)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 16/057,615

(22) Filed: Aug. 7, 2018

(65) Prior Publication Data
US 2020/0053084 A1    Feb. 13, 2020

(51) Int. Cl.
*H04L 29/06* (2006.01)
*H04L 29/08* (2006.01)

(52) U.S. Cl.
CPC .......... *H04L 63/10* (2013.01); *H04L 63/0876* (2013.01); *H04L 67/148* (2013.01)

(58) Field of Classification Search
CPC ....................................................... H04L 63/10
USPC ............................................................ 726/4
See application file for complete search history.

(56) References Cited

U.S. PATENT DOCUMENTS

| 2010/0169962 | A1* | 7/2010 | Lu ........................... | G06F 21/34 |
| | | | | 726/9 |
| 2011/0315763 | A1* | 12/2011 | Hochmuth ............. | G06K 19/07 |
| | | | | 235/380 |
| 2018/0115613 | A1* | 4/2018 | Vajravel ................. | G06F 9/452 |
| 2018/0121224 | A1* | 5/2018 | Vajravel ................ | G06F 9/4484 |
| 2019/0245848 | A1* | 8/2019 | Divoux ............... | H04L 63/0807 |

OTHER PUBLICATIONS

Guyot et al., Smart Card performances to handle Session Mobility, 2005, IEEE, 0-7803-9179-9/05) (Year: 2005).*

* cited by examiner

*Primary Examiner* — Peter C Shaw
(74) *Attorney, Agent, or Firm* — Kirton McConkie; Brian Tucker

(57) ABSTRACT

Authentication devices can be intelligently redirected in a VDI environment to thereby ensure that the redirected authentication devices remain available for authentication even after a remote session has been locked. This intelligent redirection of authentication devices can be accomplished in a way that only requires server-side modifications and that is agnostic to the remoting protocol used to establish the remote session.

18 Claims, 15 Drawing Sheets

US 10,798,097 B2

INTELLIGENT REDIRECTION OF AUTHENTICATION DEVICES

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Smart card readers are a type of USB device that can be redirected in much the same manner as described above. However, due to security concerns, the Windows operating system places limits on how an application can access a smart card that has been inserted into a smart card reader. In particular, the Windows operating system does not allow an application executing within a remote session to access a smart card unless the smart card is mapped from the remote session. Using the above described redirection techniques, a redirected smart card will appear as if it was locally connected, and therefore it will not be accessible within the remote session.

FIG. 3A provides an example of how Windows applies these limits using the same general architecture of server 104 as described above. In this example, a smart card 340 is connected directly to server 104 (i.e., not over a remote session). For ease of illustration, smart card 340 can generally represent a smart card reader alone or a smart card reader and a smart card that has been inserted into the reader.

As is typical, operating system 170 will cause appropriate drivers to be loaded for smart card 340 as represented by smart card driver stack 380. An application 370 can therefore access smart card 340 via the appropriate interfaces of operating system 170. In the Windows operating system, an application can access a smart card via a cryptographic service provider (or CSP) and the WinSCard API. This CSP may be a vendor-specific CSP or a Windows-provided CSP (Basecsp.dll) which works in tandem with a vendor-provided smart card mini-driver. CSP 170a is intended to represent either of these scenarios.

Via CSP 170a and WinSCard API 170b, application 370 can invoke functionality of the Smart Card Resource Manager service (or simply "resource manager") 170c. Resource manager 170c then interfaces with the smart card driver(s) for any smart card connected to server 104 whether physically or virtually.

Resource manager 170c is the component of the Windows operating system that is configured to block access to a smart card from any application that is running in a remote session thus making a redirected smart card inaccessible within a remote session. The exact manner in which resource manager 170c blocks access is beyond the scope of this discussion. Suffice it to say that the Windows smart card subsystem will only list mapped smart cards to applications executing within a remote session such that the smart cards, including redirected smart cards, will not be visible to such applications. For example, FIG. 3B illustrates a scenario where smart card 340 is connected to client 102 and redirected to server 104 via a remote session such that virtual smart card 390 appears on server 104. To resource manager 170c, smart card 390 will appear as a locally connected device.

In this scenario, the user may run application 370 for the purpose of accessing smart card 340. However, because application 370 is executing within a remote session, resource manager 170c will block access to smart card 340 (since it believes smart card 370 is locally connected). In short, Windows is configured to prevent a smart card from being accessed within a remote session whether or not the smart card is locally connected or redirected over a remote session.

To enable a smart card to be accessed within a remote session, driver mapping techniques have been created. FIG. 3C generally illustrates how this driver mapping can be implemented. To enable smart card access within a remote session, a driver mapping component 385 can be executed on server 104 and smart card driver stack 380 can be installed on client 102. Driver mapping component 385 can generally represent any of the possible ways in which a driver can be mapped as is known in the art. For simplicity, it can be assumed that driver mapping component 385 intercepts smart card API calls that are directed towards smart card driver stack 380 installed on server 104 and routes these API calls to proxy 210 (or another component) via remote procedure calls (RPC). In essence, this bypasses the mechanisms in the Windows Smart Card Subsystem (i.e., resource manager 170c) that would otherwise block the API calls due to application 370 being executed within a remote session. Proxy 210 can then invoke these API calls. Responses from smart card 340 can be returned in a similar manner.

Although this driver mapping technique works, it is not desirable or possible in many situations. For example, client 102 may not be compatible with the smart card driver(s) that will need to be loaded into smart card driver stack 380 in order to handle some or all of the mapped API calls. Specifically, a Linux operating system is employed on many thin clients and Windows-based smart card drivers are incompatible with Linux. Additionally, very few smart card providers have developed drivers that can be employed for driver mapping on non-Windows clients.

Further, to accommodate mismatches between the versions of the client operating system and the server operating system, current driver mapping solutions do not map all smart card APIs. For example, many smart card APIs that are available in Windows Server 2016 or Windows 10 (e.g., the SCardGetReaderDeviceInstanceId function) are not mapped and will therefore fail if invoked inside a remote session.

Finally, installing the smart card drivers on the client prevents the client from being "lightweight." For example, many entities create computing environments in which their employees use thin or zero clients. It is oftentimes desirable to minimize the components on these clients to reduce cost. Requiring the installation of the smart card drivers in turn increases the hardware requirements for the client as well as requires additional management.

U.S. Pat. Appl. Pub. No: 2018/0115613, which is incorporated herein by reference, describes various techniques for enabling a smart card to be redirected in the above-described environments (as opposed to employing driver mapping). However, even when implementing these techniques, various difficulties still exist when redirecting authentication devices such as smart cards.

USB authentication devices such as, but not limited to, smart cards are oftentimes used to authenticate a user for purposes of logging in to a remote session from a client device. For example, as part of establishing a remote session, a user may connect a smart card to a client device to establish his or her identity and also provide a PIN or other input to verify this identity. The client-side components will then send this authentication input to the server, and, if the authentication input is validated, the server will establish the remote session. Accordingly, it is necessary for the authentication device to initially be connected locally to the client device to allow the client device to obtain the authentication information for establishing the remote session. After the remote session is established, the authentication device can then be redirected to the server to allow applications executing within the remote session to access the redirected authentication device.

In scenarios where the authentication device is redirected, a problem arises when the remote session is locked due to inactivity or manual action. Once the remote session is locked, the user will be required to again log in. However, the authentication device that is required for login will still be residing on the remote session—i.e., because it is redirected, the authentication device will be locally inaccessible at the client device and therefore cannot be used to provide the necessary input on the client device to unlock the remote session. As a result, the client device in essence becomes unusable to the user, at least without shutting down and/or restarting the remote session if such options are even made available.

This problem created by the locking of the remote session is generally known in the industry. However, all of the proposed solutions are specific to and require the use of driver mapping. As indicated above, driver mapping is oftentimes an undesirable approach for at least the reasons that smart card driver mapping techniques support very limited APIs, existing applications in the remote session would need to be rewritten so that they use only the limited supported APIs, and many smart card readers do not support driver mapping.

BRIEF SUMMARY

The present invention extends to methods, systems, and computer program products for intelligently redirecting authentication devices in a VDI environment to thereby ensure that the redirected authentication devices remain available for authentication even after a remote session has been locked. This intelligent redirection of authentication devices can be accomplished in a way that only requires server-side modifications and that is agnostic to the remoting protocol used to establish the remote session.

In some embodiments, the present invention is implemented by an agent that executes on a server in a virtual desktop infrastructure environment as a method for intelligently redirecting an authentication device. In conjunction with redirecting an authentication device from a client device to the server to allow the authentication device to be accessed by applications executing within a remote session on the server, the agent registers with an operating system on the server to receive notifications of state changes of the remote session. Then, the agent receives, from the operating system, a notification that the remote session has been locked. In response to the notification that the remote session has been locked, the agent instructs a client-side proxy to cause the authentication device to no longer be redirected to the server but to be connected locally at the client device to thereby allow the authentication device to be used on the client device to unlock the remote session. In response to the remote session being unlocked, the agent causes the authentication device to again be redirected from the client device to the server.

In other embodiments, the present invention is implemented as a method in a virtual desktop infrastructure environment for intelligently redirecting an authentication device. In response to an authentication device being connected to a client device while the client device has established a remote session on a server, the authentication device is redirected to the server to enable the authentication device to be accessed from within the remote session. An agent executing on the server then receives a notification of a state change of the remote session. The notification is received while the authentication device is redirected to the server. The agent determines that the notification of the state change indicates that the remote session has been locked. The agent then sends a notification that instructs a proxy executing on the client device to cease the redirection of the authentication device. In response to the notification received from the agent, the proxy causes the authentication device to be locally connected to the client device rather than being redirected to the server.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

As mentioned in the background, the present invention can be implemented in conjunction with smart card redirection techniques such as those described in U.S. Pat. Appl. Pub. No: 2018/0115613. It is noted, however, that the same techniques can be employed when other types of authentication devices are redirected, and therefore, the present invention should not be limited to smart card redirection scenarios. It is also noted that the techniques of the present invention are largely implemented independent of the higher level techniques described in U.S. Pat. Appl. Pub. No: 2018/0115613 which is why the same techniques can be employed in smart card and non-smart card authentication device redirection scenarios as will become apparent below.

Figure 1:
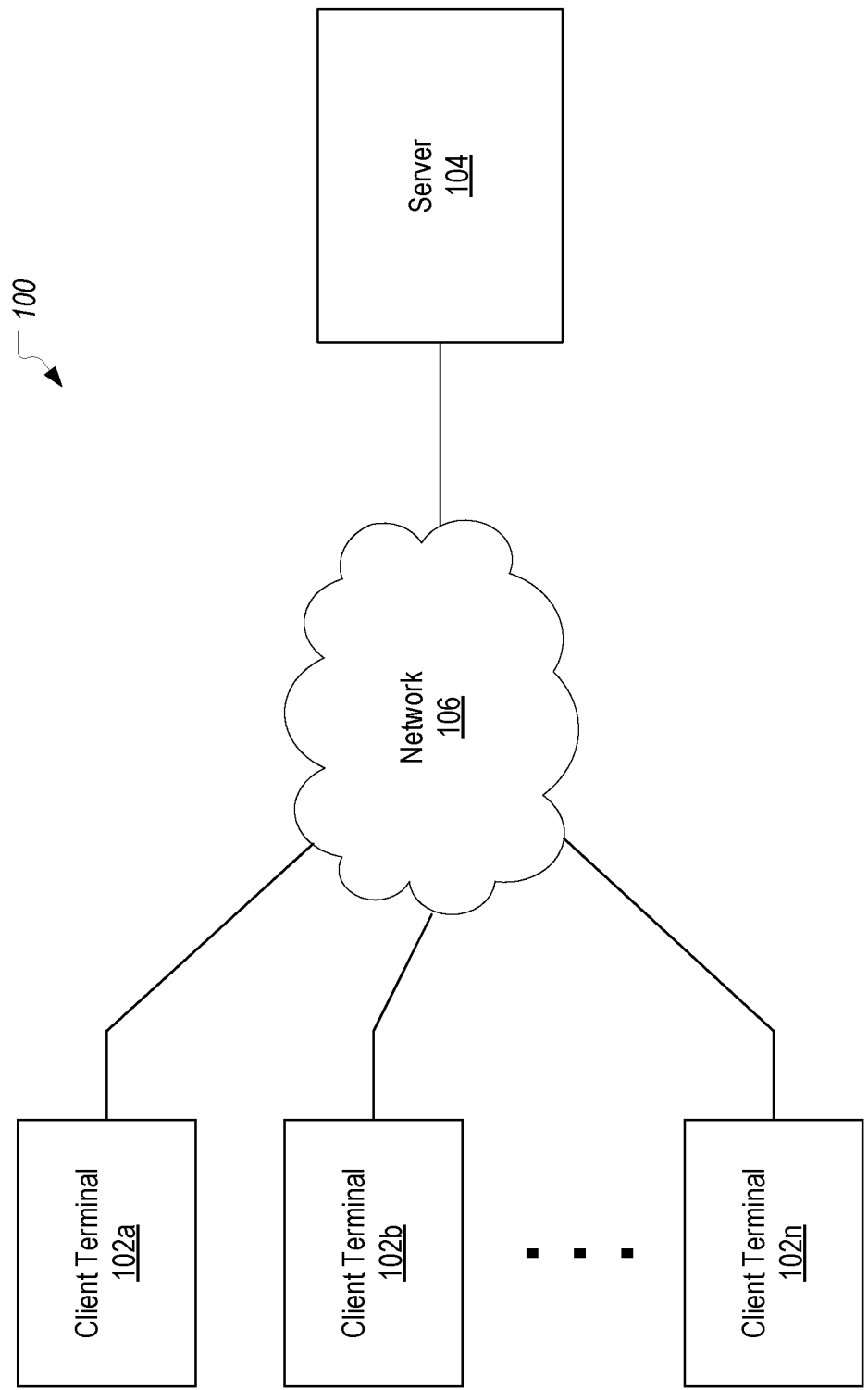
FIG. 1 illustrates an example computing environment in which the present invention can be implemented.
Figure 2:
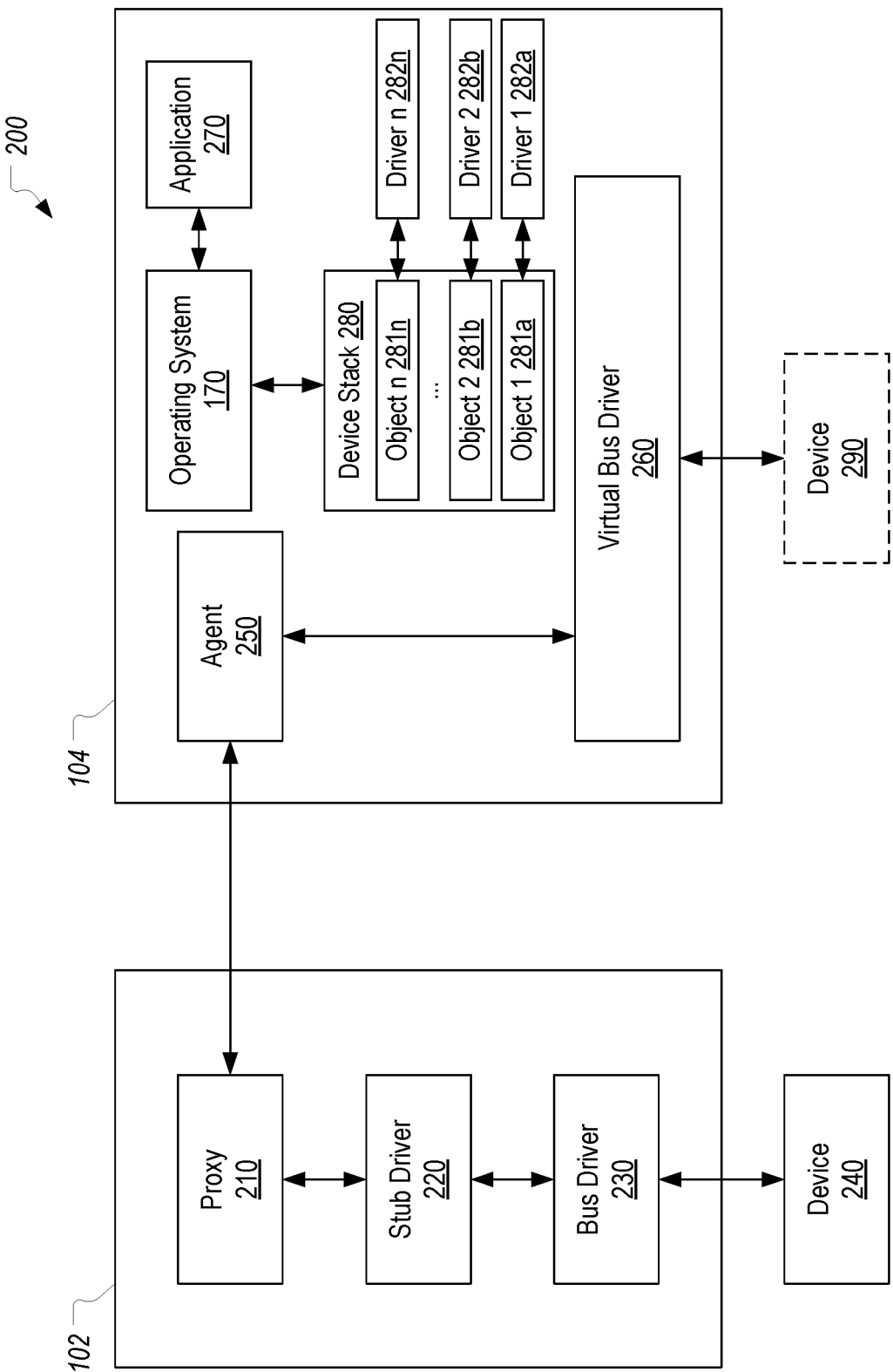
FIG. 2 illustrates how a USB device can be redirected from a client terminal to a server.
Figure 3A:
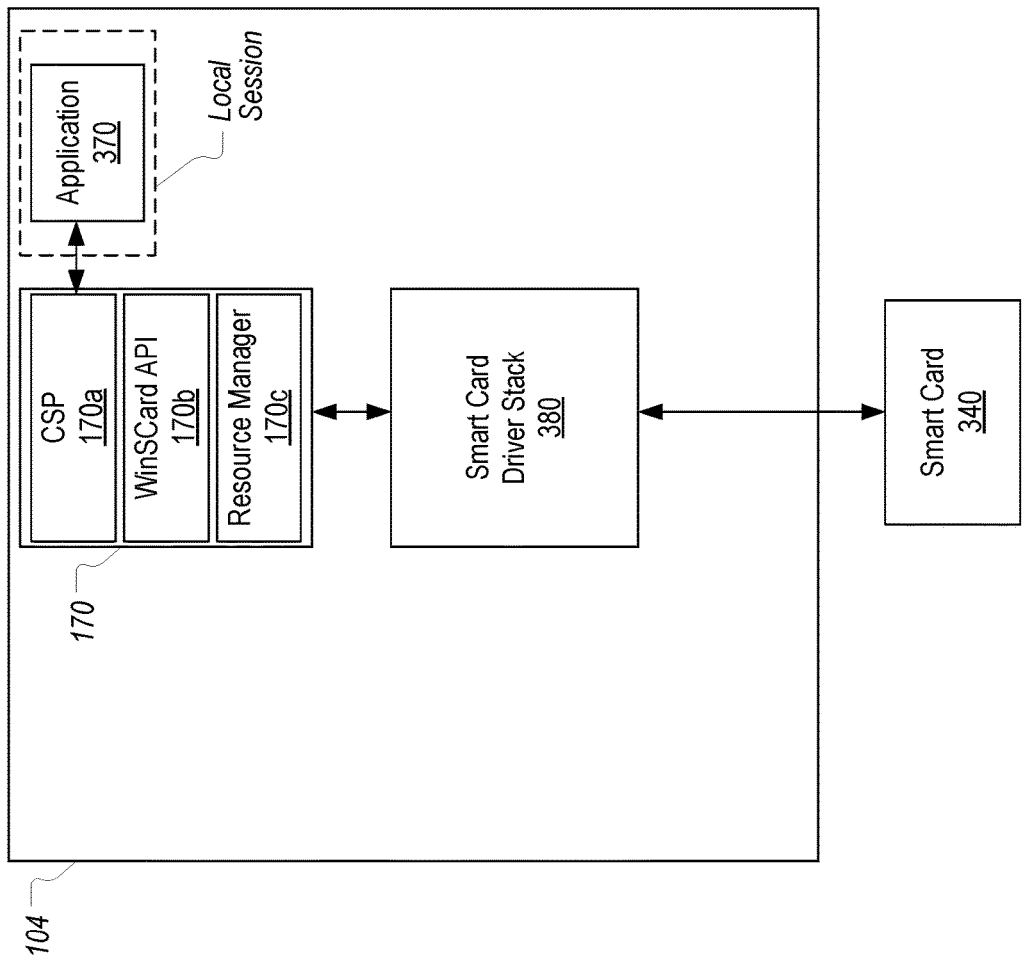
FIG. 3A illustrates how the Windows operating system provides access to a locally connected smart card.
Figure 3B:
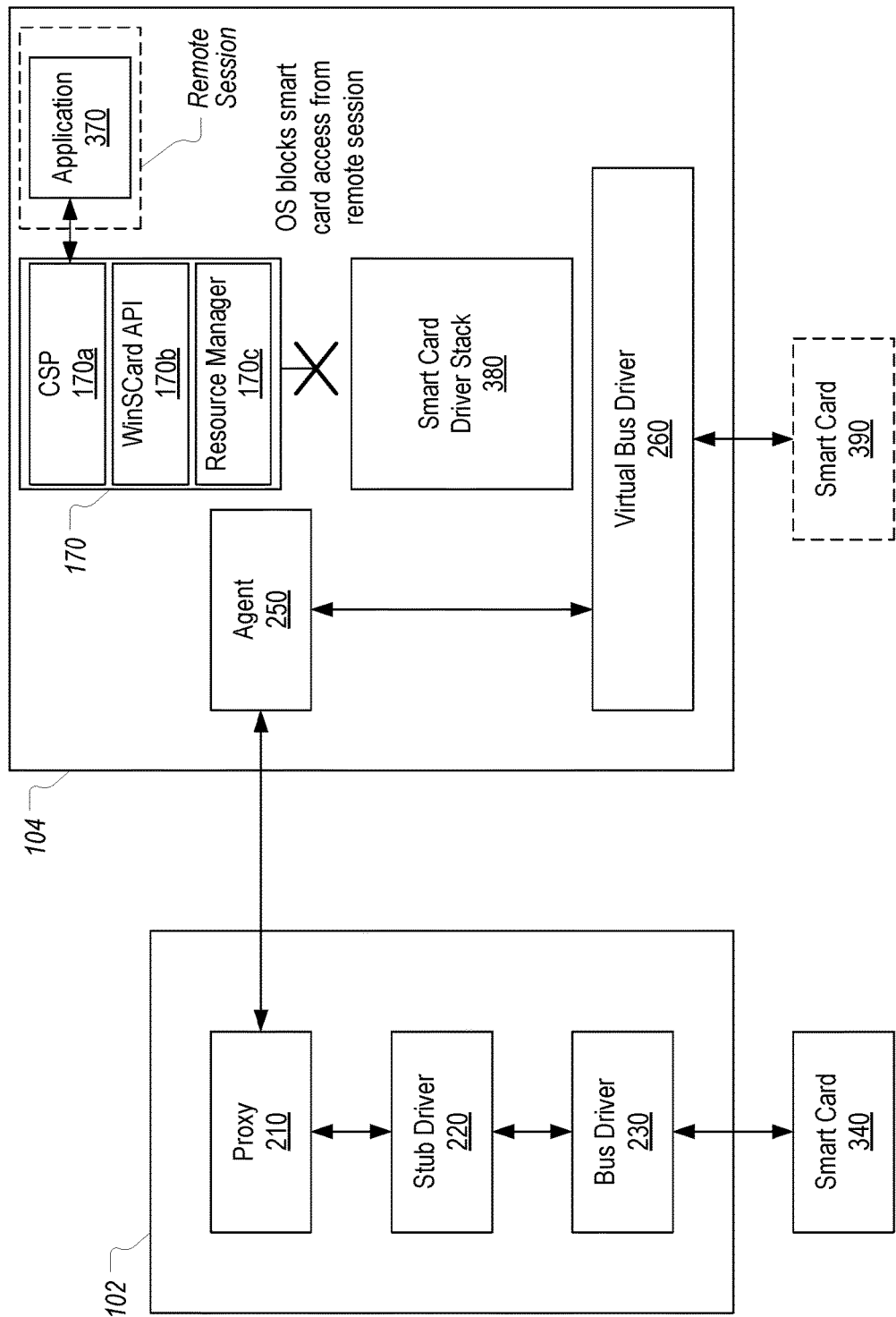
FIG. 3B illustrates how the Windows operating system prevents a smart card from being accessed by an application running in a remote session.
Figure 3C:
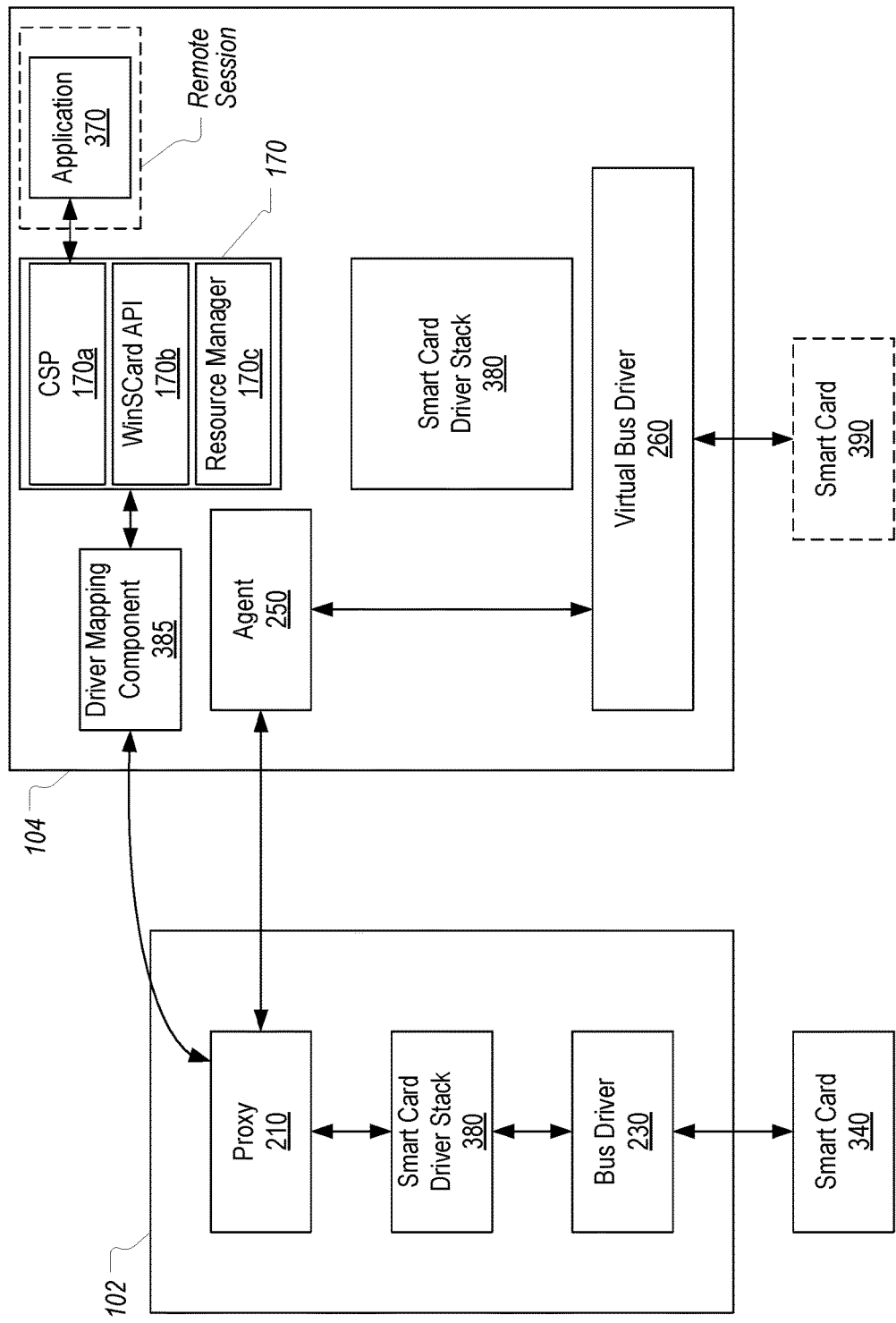
FIG. 3C illustrates how the Windows operating system performs driver mapping to enable a redirected smart card to be accessed from within a remote session.
Figure 4:
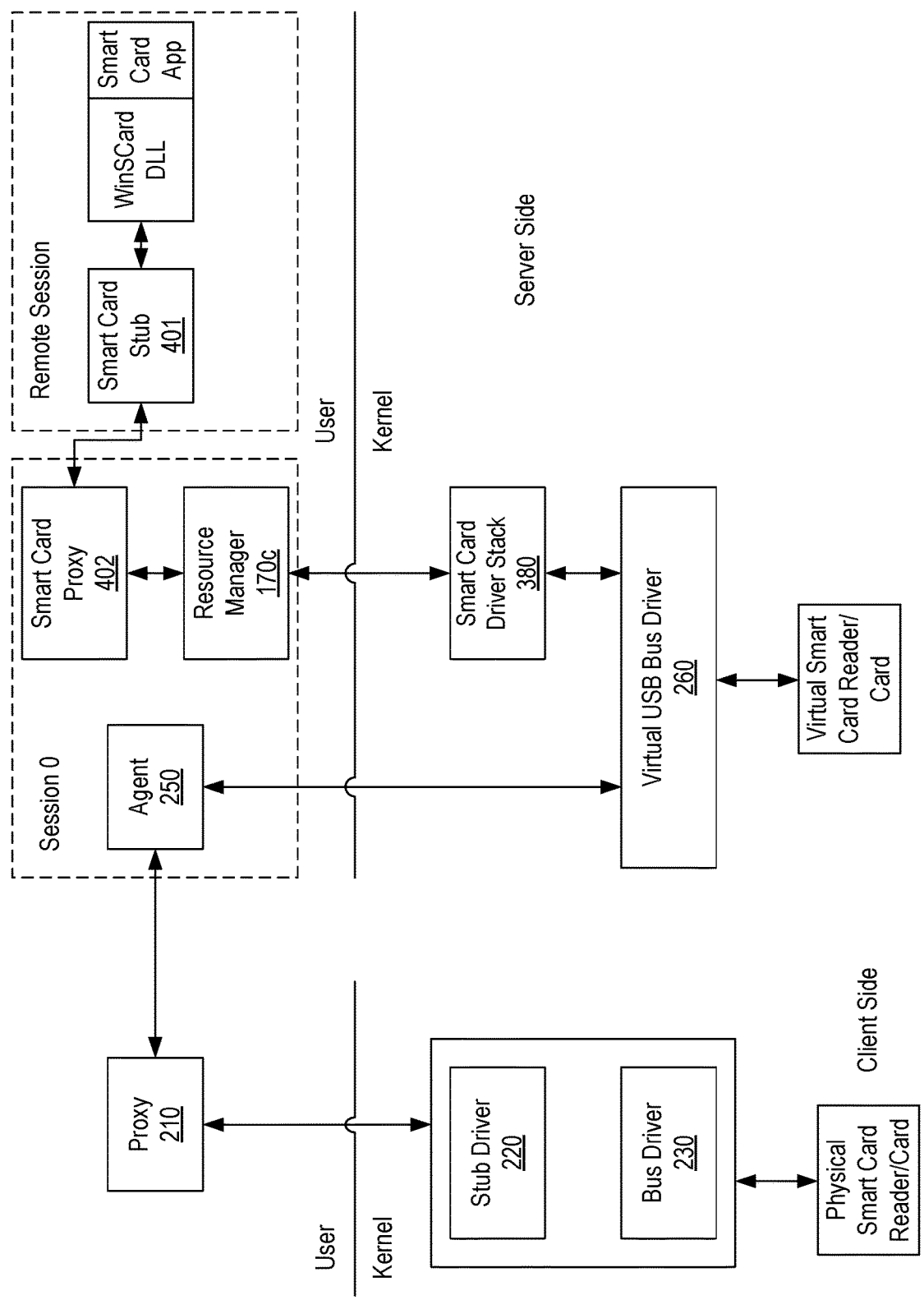
FIG. 4 illustrates an example client/server architecture that can be employed to implement embodiments of the present invention when smart card authentication devices are redirected.

FIG. 4 is provided to present additional context for smart card redirection scenarios and represents the client/server architecture that can be employed to enable a redirected smart card to be accessed from within a remote session. As was described in the background, when a smart card is connected to a client that has established a remote session with a server, the virtual desktop infrastructure can redirect the smart card to the server to cause the smart card to appear as if it were physically connected to the server. In this scenario, the server will create a remote (or user) session in which any applications accessed by the client will be executed. FIG. 4 illustrates that a smart card application has been invoked by the client and is therefore running in a remote session. The smart card application is configured to use CSP and the WinSCard DLL for purposes of making smart card API calls as is known.

Also, as described in U.S. Pat. Appl. Pub. No: 2018/0115613, smart card stub 401 can also be loaded in the remote session in a manner that allows it to intercept the smart card application's smart card API calls. When smart card stub 401 intercepts a smart card API call, it will use RPC to pass the API call to smart card proxy 402 which is executing in session 0. Smart card proxy 402 will then invoke the API call causing resource manager 170c to believe that the call has originated within session 0. Resource manager 170c will perform its processing to cause the proper communications to be delivered to smart card driver stack 380 (e.g., causing suitable IRPs/URBs to be routed down to smart card driver stack 380). After passing through smart card driver stack 380, virtual USB bus driver 260 will receive the communications and can route them to proxy 210 via agent 250. Proxy 210 can then deliver the communications to the smart card reader and/or smart card connected to the client. Any response generated by the smart card reader and/or smart card will then be routed back in a reverse manner.

In this way, any application that is executed in a remote session will be able to access a smart card including a smart card that is redirected from the client that established the remote session. A user will therefore be able to change a password or certificate of a smart card (or perform any other provided function) from a remote session without needing to employ driver mapping techniques.

Figure 5:
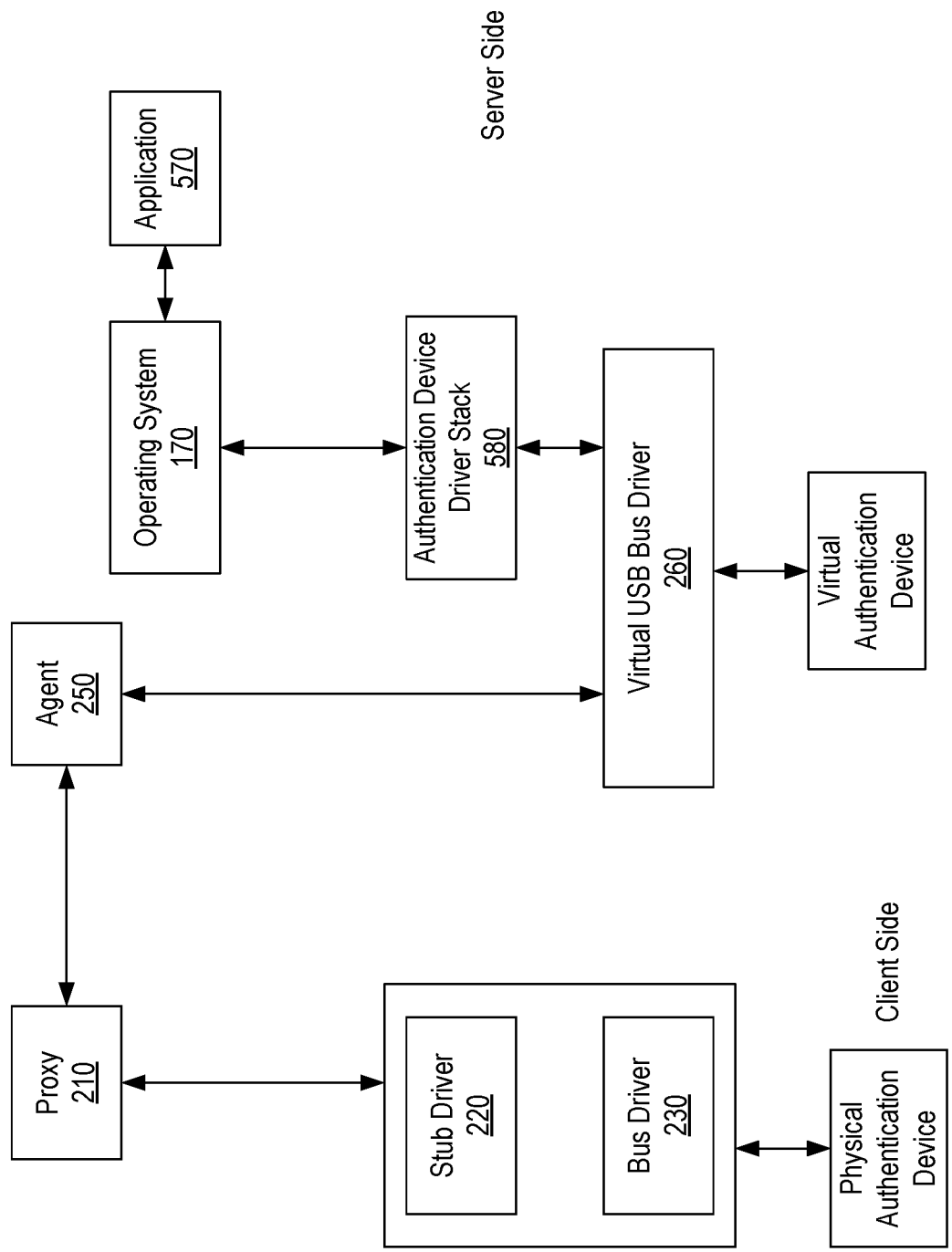
FIG. 5 illustrates an example client/server architecture that can be employed to implement embodiments of the present invention when other authentication devices are redirected.

FIG. 5 represents the client/server architecture that can be employed to enable a redirected authentication device other than a smart card to be accessed from within a remote session. As described above, when the authentication device is redirected to the server, an application 570 executing within the remote session will be able to access the authentication device. Accordingly, the present invention can be implemented in both of the client/server architectures shown in FIGS. 4 and 5. Notably, the same client components and the same underlying server-side components can be employed in each case.

FIGS. 6A-6F illustrate a process by which the server-side agent 250 can ensure that a redirected authentication device remains available for authentication even after a remote session has been locked. In these figures and the corresponding discussion, it will be assumed that an authentication device has been connected to client 102, used locally on client 102 to authenticate the user for purposes of establishing a remote session on server 104, and then redirected to server 104 to enable applications executing within the remote session to access it.

Figure 6A:
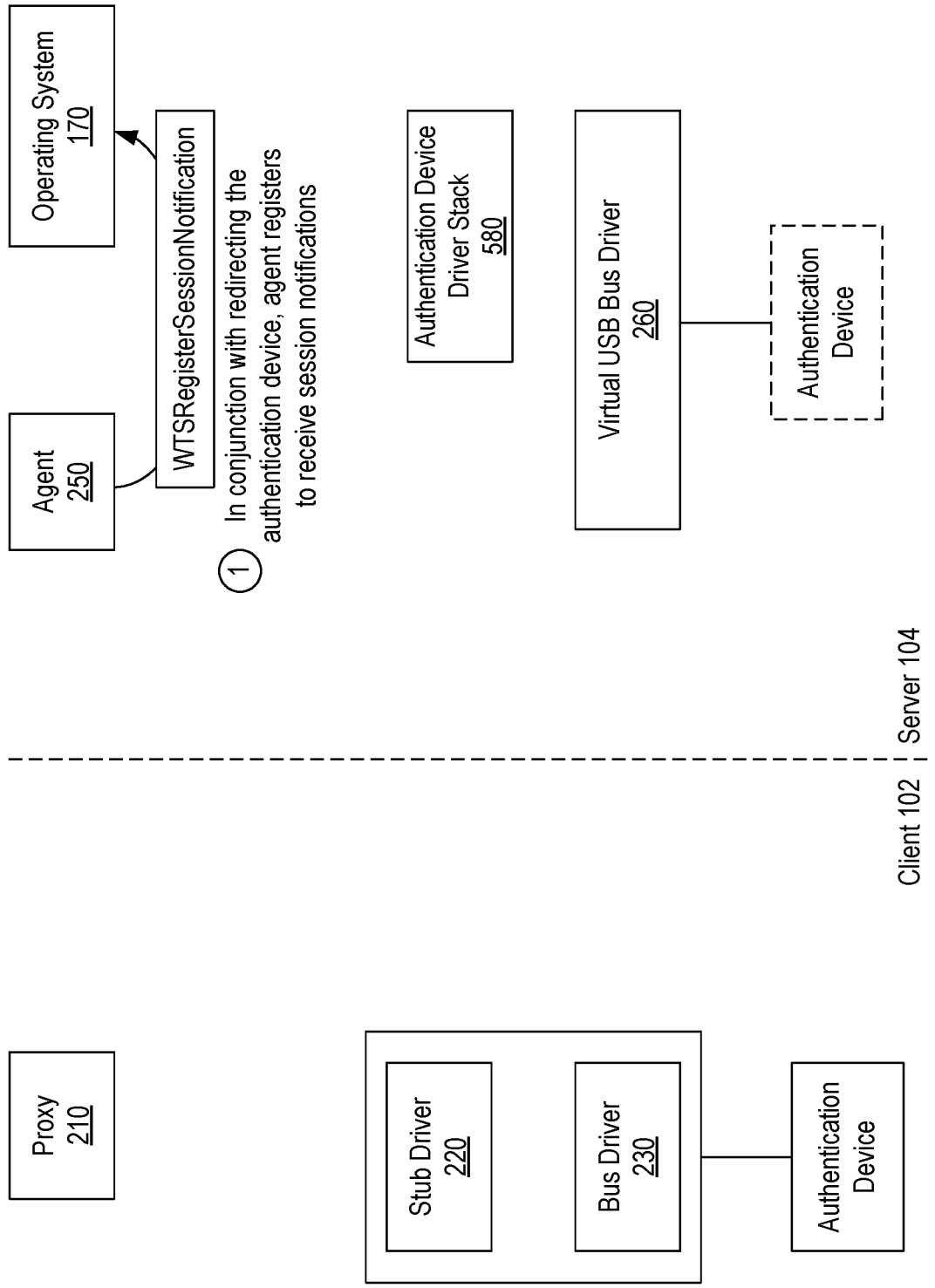
FIGS. 6A-6F illustrates an example process by which the server-side agent can ensure that a redirected authentication device remains available for authentication even after a remote session has been locked.

In step 1 as shown in FIG. 6A, and in conjunction with redirecting the authentication device to serer 104, agent 250 registers with operating system 170 to receive session notifications. As an example only, in a Windows environment, this could be accomplished by calling the WTSRegisterSessionNotification function of the Remote Desktop Services API. After step 1, the authentication device will be accessible to applications executing within the remote session and agent 250 will be registered to receive any session notifications pertaining to this remote session.

Figure 6B:
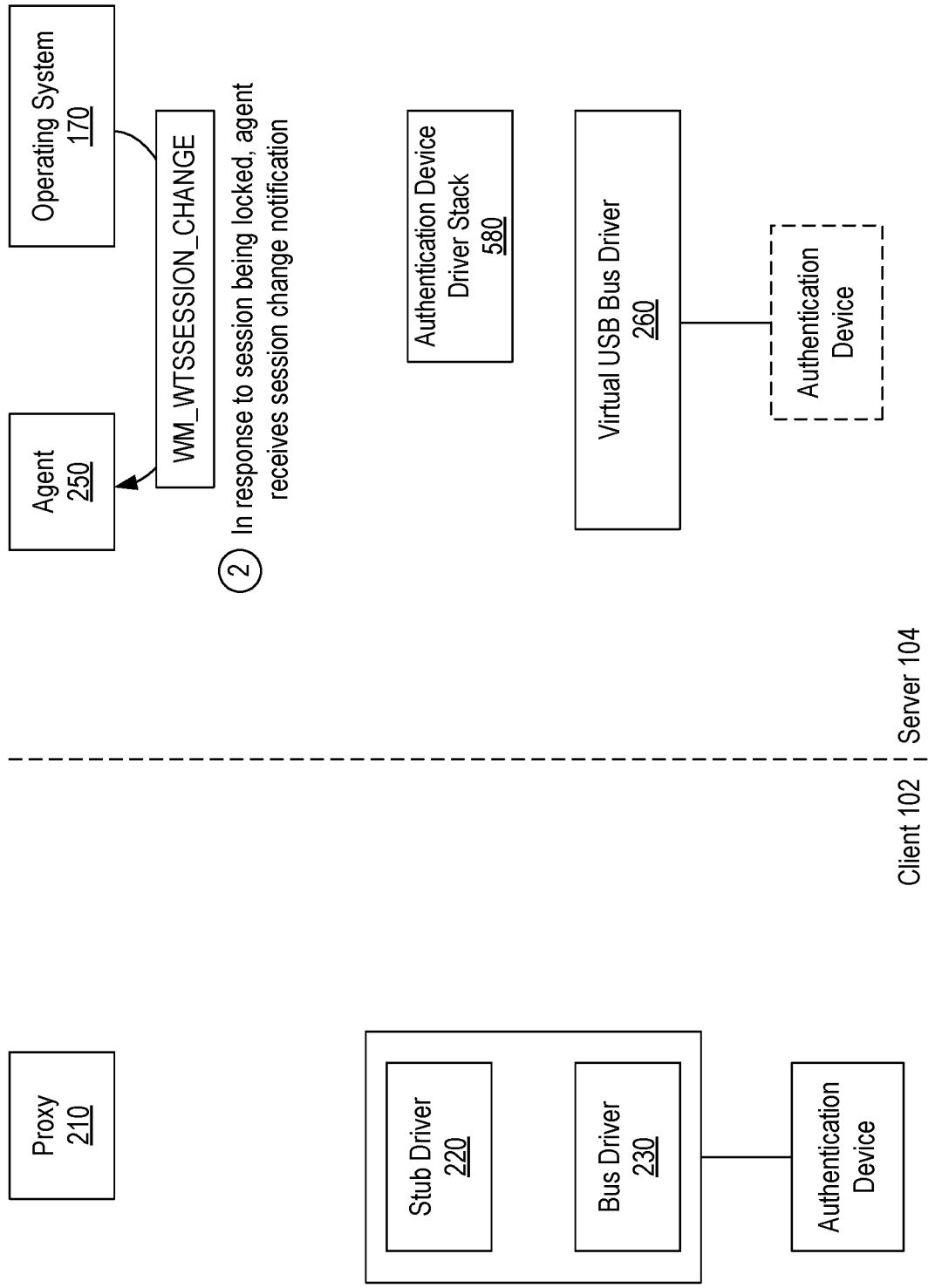

Next, in FIG. 6B, it will be assumed that the remote session has been locked (e.g., due to inactivity or in response to user input). In step 2, because agent 250 has registered for session notifications, operating system 170 will notify agent 250 that the session has been locked. For example, in a Windows environment, operating system 170 may send a WM_WTSSESSION_CHANGE message to agent 250 with a status code of WTS_SESSION_LOCK (0×7). It is noted that operating system 170 could send WM_WTSSESSION_CHANGE messages to agent 250 for other types of session state changes, and therefore agent 250 can be configured to evaluate the parameters of this message in order to respond appropriately.

Figure 6C:
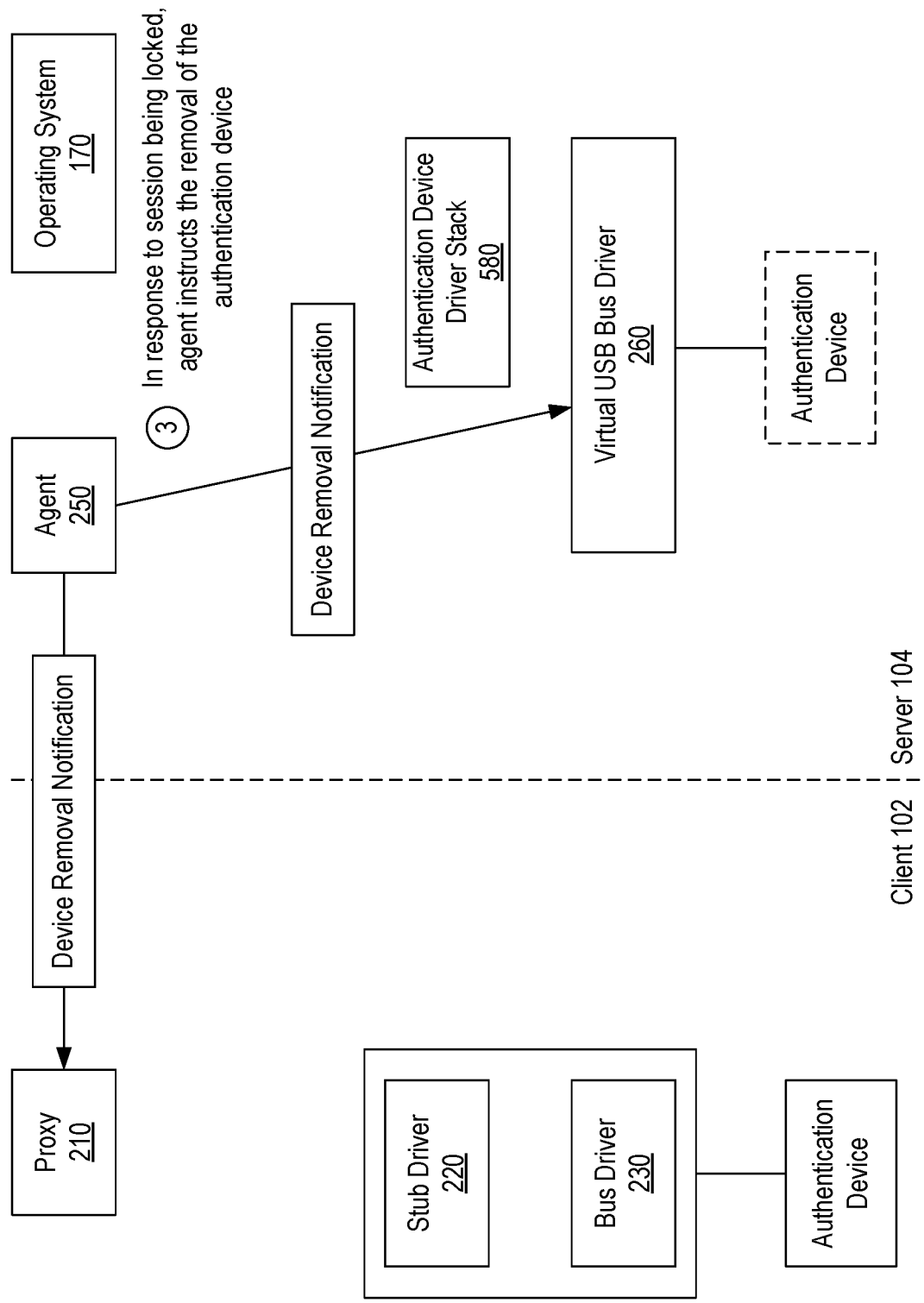

Assuming that the session change notification received in step 2 indicates that the session has been locked, agent 250 can respond by instructing the removal of the authentication device from the remote session as represented as step 3 in FIG. 6C. For example, agent 250 could send a device removal notification to virtual USB bus driver 260 on server 104 and could also send a device removal notification to proxy 210 on client 102.

Figure 6D:
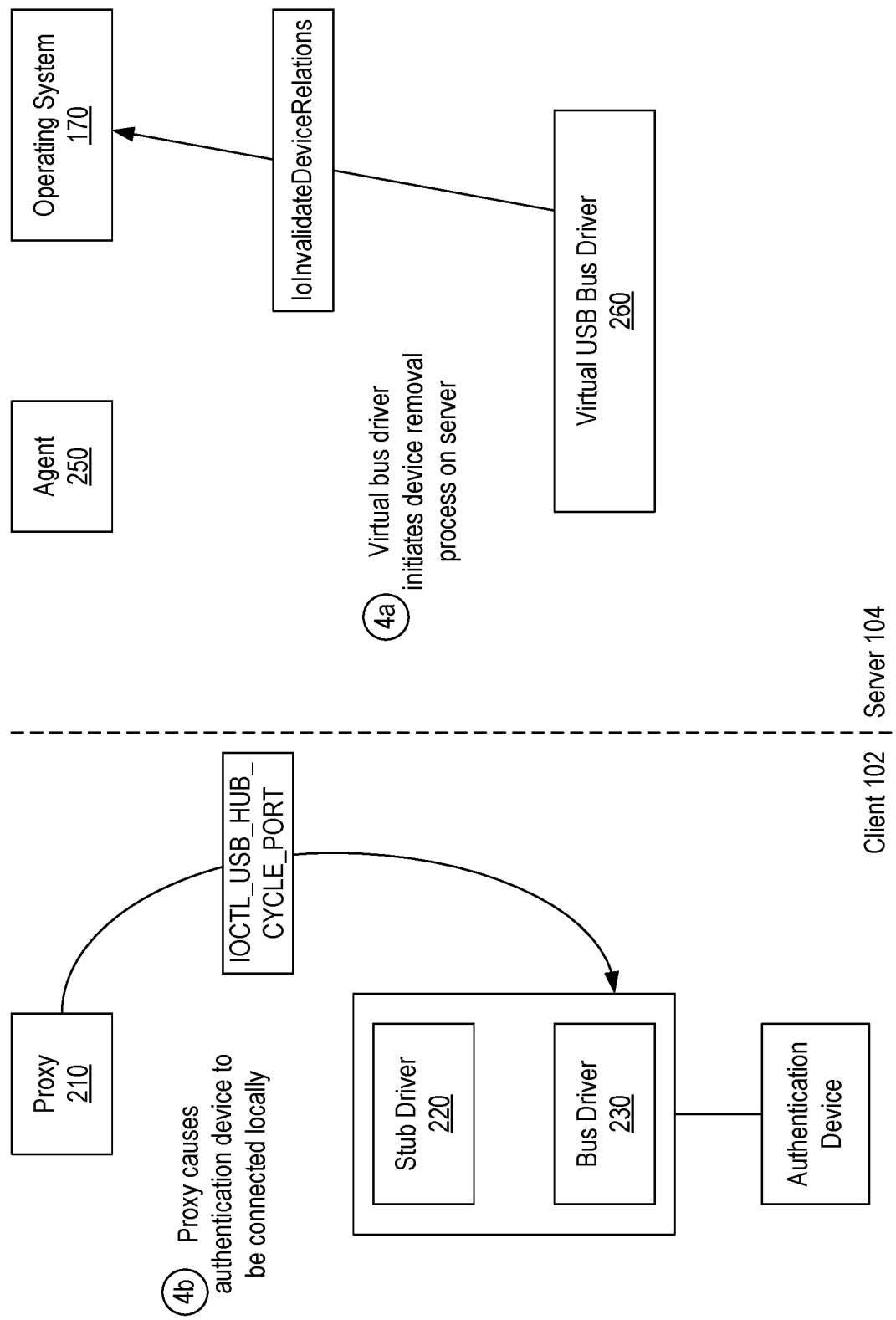

In response to the device removal notification, virtual USB bus driver 260 can initiate the process of removing the authentication device from server 104 as represented as step 4a in FIG. 6D. As an example, virtual USB bus driver 260 could call IoInvalidateDeviceRelations to report that the authentication device has been disconnected. In response, the PnP manager of operating system 170 would cause authentication device driver stack 580 to be removed.

On the client side, proxy 210 can respond to the device removal notification by causing the authentication device to again be connected locally on client 102 as represented as step 4b in FIG. 6D. As an example, proxy 210 could cause an IOCTL_USB_HUB_CYCLE_PORT I/O request to be issued on client 102 which will simulate a device unplug and replug on the USB port associated with bus driver 230. This IOCTL will result in the authentication device being made accessible locally. For example, stub driver 220 may be configured to cause a USB device to be redirected only when a remote session has been connected or unlocked, and therefore this IOCTL received while the session is locked will cause stub driver 220 to keep the authentication device local. As such, after step 4b, the authentication device will function as a locally connected device in a normal (i.e., non-redirection) manner.

Figure 6E:
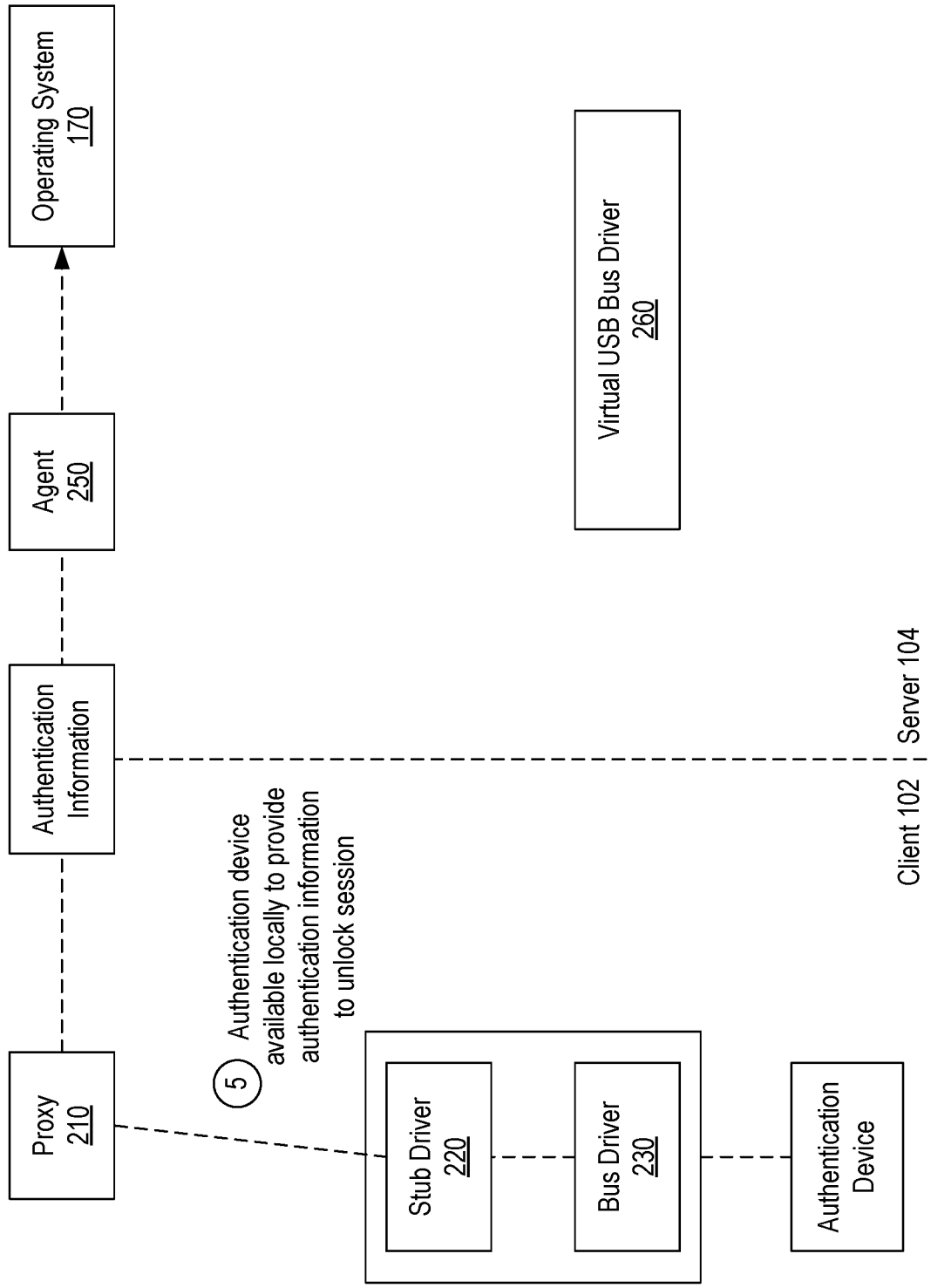

Of primary importance, by returning the authentication device to client 102 in response to the remote session being locked, the authentication device will be available locally to provide authentication information necessary to log back into (i.e., unlock) the remote session. For example, FIG. 6E illustrates a step 5 in which authentication information is obtained locally on client 102 (e.g., via I/O requests originating on client 102) and routed by stub driver 220 and proxy 210 to agent 250 and ultimately to operating system 170 for the purpose of logging into the locked remote session. Although not shown, this authentication information can include manually entered local input such as a PIN or password.

Figure 6F:
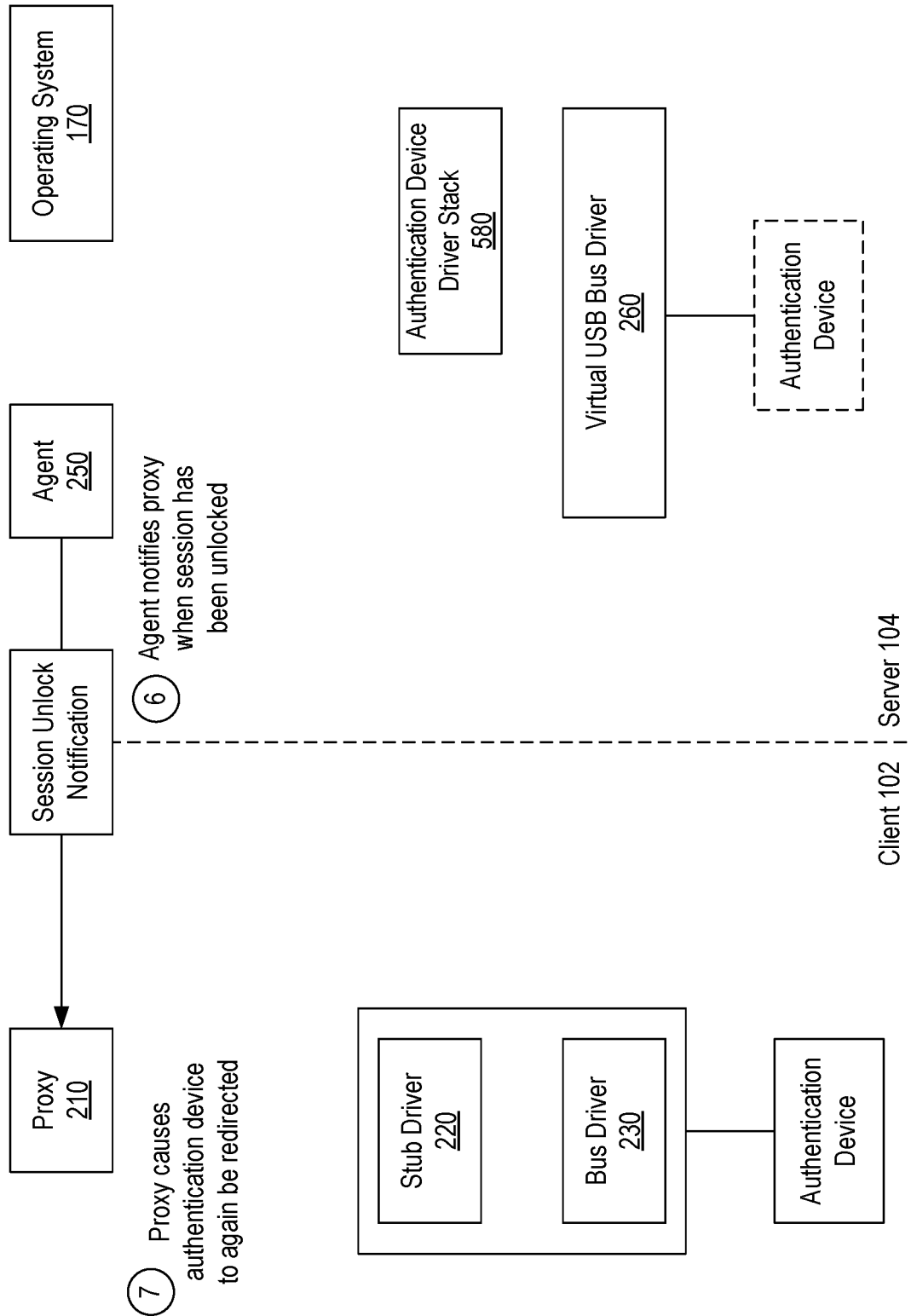

Once the remote session is unlocked, agent 250 will be notified (e.g., via a WM_WTSSESSION_CHANGE message), and in turn, in step 6 shown in FIG. 6F, can notify proxy 210. Proxy 210 can then cause the authentication device to again be redirected to the server in step 7. For example, proxy 210 can cause an IOCTL_USB_HUB_CYCLE_PORT_I/O request to be issued to again simulate a device unplug and replug on the USB port associated with bus driver 230. At this point, since a remote session is active, stub driver 220 will redirect the authentication device rather than keep it local. In this way, the authentication device will again be accessible to applications executing within the remote session.

As can be seen, agent 250 ensures that a redirected authentication device will be returned to the client whenever the remote session is locked. As a result, the authentication device will be available locally to allow the user to log back into the locked session. Then, once the user has unlocked the session, the authentication device will again be redirected. This process can be repeated each time a remote session is locked.

In some cases, the above-described process may result in a forced logoff. For example, some operating systems, such as Windows, allow an application to specify an action to be performed when an authentication device, and particularly a smart card, is removed. If an application executing in the remote session has specified that a logoff should be forced whenever a smart card is removed from the server, and the above-described process is performed in response to the remote session being locked, a forced logoff will be performed. This can result in various undesirable consequences including loss of work and would require the user to establish a new session.

Figure 7:
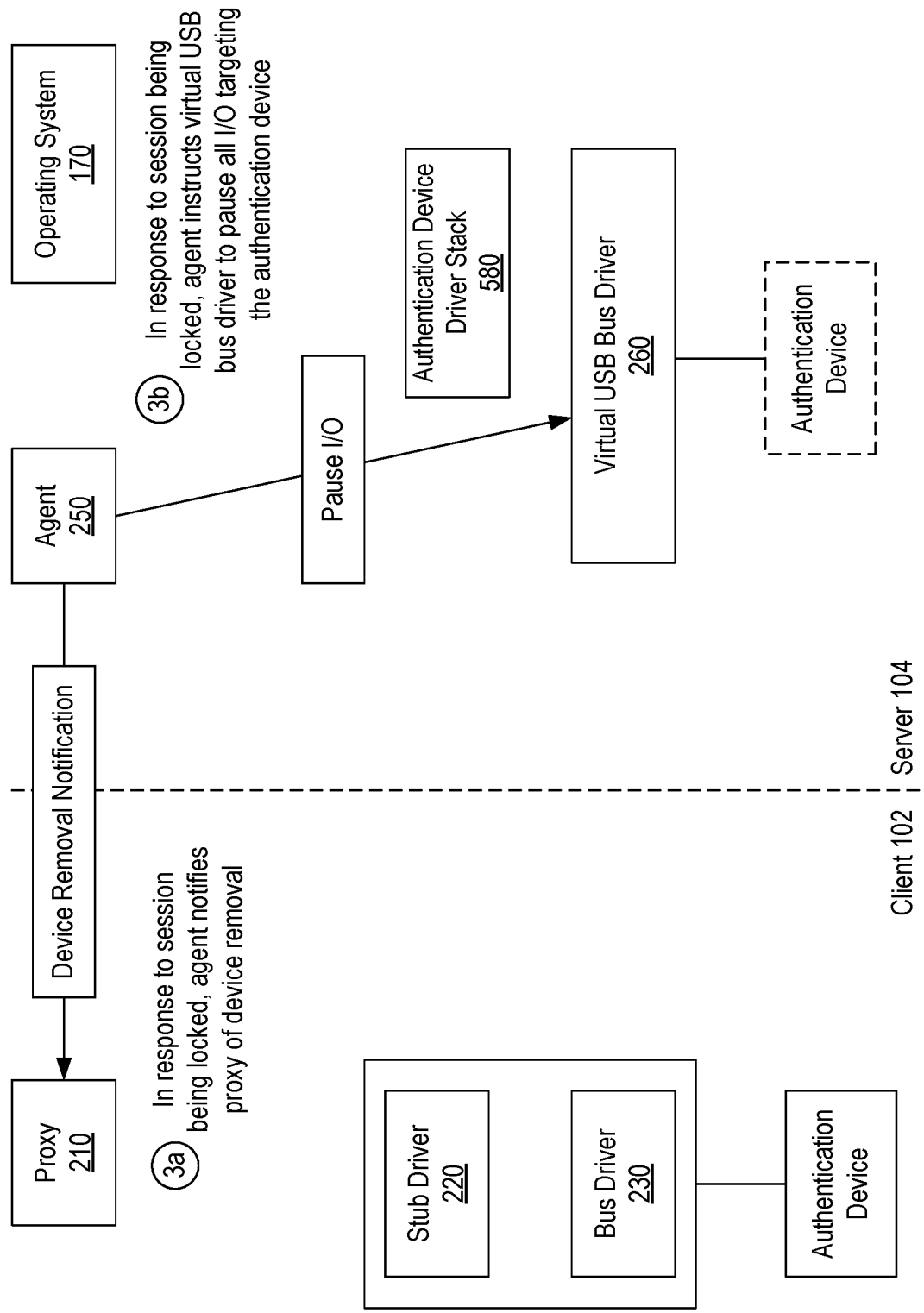
FIG. 7 illustrates an augmentation to the process shown in FIGS. 6A-6F.

To address such scenarios, the above-described process can be augmented to cause the authentication device to appear as if it were still redirected to the server even while it has been returned to the client. FIG. 7 illustrates how the process can be augmented.

FIG. 7 corresponds with FIG. 6C but replaces step 3 with separate steps 3a and 3b. In step 3a, agent 250 notifies proxy 210 that the authentication device should be returned to client 102 and is therefore the same as described above. In contrast, in step 3b, agent 250 does not instruct virtual USB bus driver 260 to initiate the device removal process, but instead instructs virtual USB bus driver 260 to pause all I/O targeting the authentication device. As a result, authentication device driver stack 580 will remain on server 104 (e.g., because virtual USB bus driver 260 would not call IoInvalidateDeviceRelations) and will therefore cause the authentication device to appear as if it were still accessible to the applications within the locked remote session. To accomplish this pausing of I/O, virtual USB bus driver 260 may implement any suitable technique such as queuing any IRPs that are received while the authentication device is released to client 102.

Although not shown, once the user has logged back into the remote session and proxy 210 has initiated the process of again redirecting the authentication device to server 104, agent 250 will instruct virtual USB bus driver 260 to resume the I/O that targets the authentication device. Because the software representation of the authentication device (e.g., authentication device driver stack 580) was never actually removed from server 104, redirection can be resumed on the server side as if the authentication device had never been returned to client 102.

For security reasons, as part of "resuming" the redirection of the authentication device, agent 250 can first confirm that the request to redirect the authentication device was received from the same client and user and that it is being redirected to the same remote session as before (e.g., by evaluating a session ID in the redirection request against a session ID that was stored when the authentication device was originally redirected). If this criteria is not met, agent 250 can instead instruct virtual USB bus driver 260 to create a new device instance rather than reuse the existing instance.

Agent 250 enables this process to be performed in a seamless manner that is largely transparent to the other server-side components in the redirection architecture. For example, operating system 170 and the applications executing in the remote session may see that I/O has been paused, but would not know that the authentication device is currently connected locally to client 102.

Figure 8:
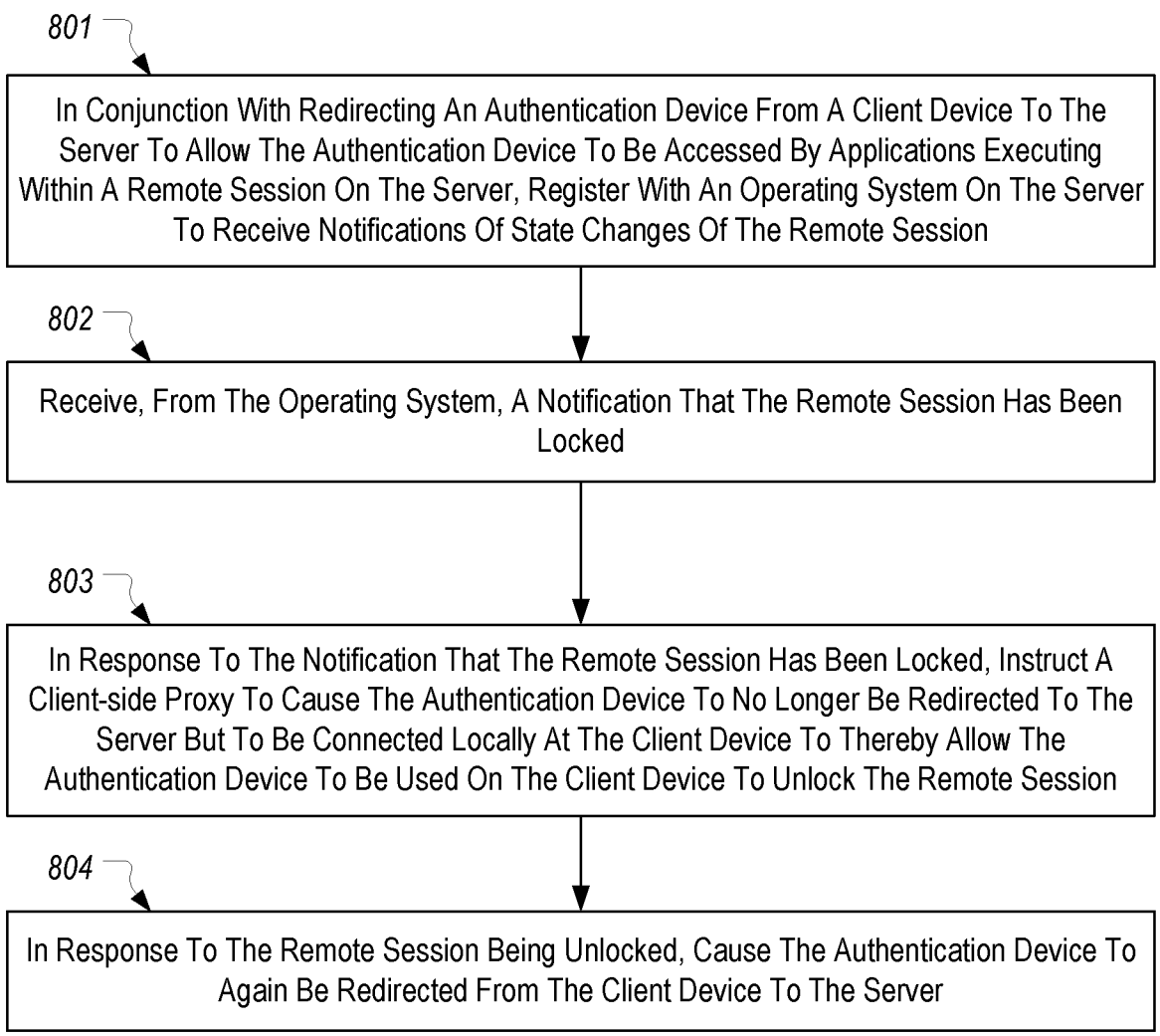
FIG. 8 illustrates a flowchart of an example method for intelligently redirecting authentication devices.

FIG. 8 provides a flowchart of an example method 800 for intelligently redirecting an authentication device. Method 800 can be implemented by agent 250 on server 104 or any other computing device capable of implementing USB redirection in a VDI environment.

Method 800 includes an act 801 of, in conjunction with redirecting an authentication device from a client device to the server to allow the authentication device to be accessed by applications executing within a remote session on the server, registering with an operating system on the server to receive notifications of state changes of the remote session. For example, in Windows environments, agent 250 can call the WTSRegisterSessionNotification function of the Remote Desktop Services API.

Method 800 includes an act 802 of receiving, from the operating system, a notification that the remote session has been locked. For example, agent 250 can receive a WM_WTSSESSION_CHANGE message with a status code of WTS_SESSION_LOCK.

Method 800 includes an act 803 of, in response to the notification that the remote session has been locked, instructing a client-side proxy to cause the authentication device to no longer be redirected to the server but to be connected locally at the client device to thereby allow the authentication device to be used on the client device to unlock the remote session. For example, agent 250 can send a notification to proxy 210 instructing the proxy to return the authentication device to client 102.

Method 800 includes an act 804 of, in response to the remote session being unlocked, causing the authentication device to again be redirected from the client device to the server. For example, after the user has employed the authentication device locally on client 102 to unlock the remote session on server 104, agent 250 can again cause the authentication device to be redirected to server 104 for access within the unlocked remote session.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an agent that executes on a server in a virtual desktop infrastructure environment, for intelligently redirecting an authentication device, the method comprising:
   in conjunction with redirecting an authentication device from a client device to the server to allow the authentication device to be accessed by applications executing within a remote session on the server, registering with an operating system on the server to receive notifications of state changes of the remote session;
   receiving, from the operating system, a notification that the remote session has been locked;
   in response to the notification that the remote session has been locked, instructing a client-side proxy to cause the authentication device to no longer be redirected to the server but to be connected locally at the client device to thereby allow the authentication device to be used on the client device to unlock the remote session; and
   in response to the remote session being unlocked, causing the authentication device to again be redirected from the client device to the server.

2. The method of claim 1, further comprising:
   in conjunction with instructing the client-side proxy to cause the authentication device to no longer be redirected to the server, instructing a virtual bus driver on the server to cause the authentication device to be disconnected from the remote session.

3. The method of claim 1, further comprising:
   in conjunction with instructing the client-side proxy to cause the authentication device to no longer be redirected to the server, instructing a virtual bus driver on the server to pause I/O requests targeting the authentication device without causing the authentication device to be disconnected from the remote session.

4. The method of claim 1, wherein the authentication device comprises a smart card.

5. The method of claim 4, wherein instructing a virtual bus driver on the server to pause I/O requests targeting the authentication device without causing the authentication device to be disconnected from the remote session comprises instructing the virtual bus driver to retain a device object pertaining to the authentication device.

6. The method of claim 4, further comprising:
   prior to causing the authentication device to again be redirected from the client device to the server, verifying that the authentication device is again being redirected from the same client device for access within the same remote session.

7. The method of claim 1, wherein the authentication device comprises a smart card.

8. The method of claim 1, wherein causing the authentication device to again be redirected from the client device to the server in response to the remote session being unlocked comprises:
   notifying the client-side proxy that the remote session has been unlocked.

9. A method, implemented in a virtual desktop infrastructure environment, for intelligently redirecting an authentication device, the method comprising:
   in response to an authentication device being connected to a client device while the client device has established a remote session on a server, redirecting the authentication device to the server to enable the authentication device to be accessed by an application executing within the remote session;
   registering, by an agent executing on the server and with an operating system on the server, to receive notifications of state changes of the remote session;
   receiving, by the agent and from the operating system, a notification of a state change of the remote session, the notification being received while the authentication device is redirected to the server;
   determining that the notification of the state change indicates that the remote session has been locked;
   sending, by the agent, a notification that instructs a proxy executing on the client device to cease the redirection of the authentication device;
   in response to the notification received from the agent, causing, by the proxy, the authentication device to be locally connected to the client device rather than being redirected to the server, thereby allowing the authentication device to be used on the client device to unlock the remote session; and
   in response to the remote session being unlocked, causing the authentication device to again be redirected from the client device to the server.

10. The method of claim 9, further comprising:
    in conjunction with sending the notification to the proxy, instructing, by the agent, a virtual bus driver on the server to cause the authentication device to be disconnected from the remote session.

11. The method of claim 9, further comprising:
    in conjunction with sending the notification to the proxy, instructing, by the agent, a virtual bus driver on the server to pause I/O requests targeting the authentication device without causing the authentication device to be disconnected from the remote session.

12. The method of claim 11, wherein the authentication device comprises a smart card.

13. The method of claim 11, wherein instructing a virtual bus driver on the server to pause I/O requests targeting the authentication device without causing the authentication device to be disconnected from the remote session comprises instructing the virtual bus driver to retain a device object pertaining to the authentication device.

14. The method of claim 9, further comprising:
in conjunction with sending the notification to the proxy, instructing, by the agent, a virtual bus driver on the server to pause I/O requests targeting the authentication device without causing the authentication device to be disconnected from the remote session; and
in response to the authentication device being again redirected from the client device to the server, resuming I/O requests targeting the authentication device.

15. One or more computer storage media storing computer-executable instructions which when executed by one or more processors implement a method for intelligently redirecting an authentication device, the method comprising:
in response to an authentication device being connected to a client device while the client device has established a remote session on a server, redirecting the authentication device to the server to enable the authentication device to be accessed by an application executing within the remote session;
registering, by an agent executing on the server and with an operating system on the server, to receive notifications of state changes of the remote session;
receiving, by the agent and from the operating system, a notification of a state change of the remote session, the notification being received while the authentication device is redirected to the server;
determining that the notification of the state change indicates that the remote session has been locked;
sending, by the agent, a notification that instructs a proxy executing on the client device to cease the redirection of the authentication device;
in response to the notification received from the agent, causing, by the proxy, the authentication device to be locally connected to the client device rather than being redirected to the server, thereby allowing the authentication device to be used on the client device to unlock the remote session;
while the authentication device is locally connected to the client device, employing the authentication device to provide authentication information for unlocking the remote session; and
in response to the remote session being unlocked, again redirecting the authentication device to the server.

16. The computer storage media of claim 15, wherein the authentication device comprises a smart card.

17. The computer storage media of claim 15, wherein redirecting the authentication device to the server comprises causing a device object to be created on the server to represent the authentication device; and
wherein again redirecting the authentication device to the server comprises using the same device object.

18. The computer storage media of claim 17, wherein the method further comprises:
in conjunction with sending the notification that instructs the proxy executing on the client device to cease the redirection of the authentication device, instructing a virtual bus driver on the server to disconnect the authentication device from the remote session.

* * * * *